United States Patent
Mandelstein et al.

(10) Patent No.: US 9,411,836 B2
(45) Date of Patent: Aug. 9, 2016

(54) FACILITATING CONSISTENCY BETWEEN A GLOSSARY AND A REPOSITORY

(71) Applicant: International Business Machines Corporation, Armonk, NY (US)

(72) Inventors: Dan J Mandelstein, Austin, TX (US); Sushain Pandit, Austin, TX (US); Fenglian Xu, Chandlers Ford (GB)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 246 days.

(21) Appl. No.: 14/106,103

(22) Filed: Dec. 13, 2013

(65) Prior Publication Data

US 2015/0169666 A1    Jun. 18, 2015

(51) Int. Cl.
*G06F 17/30* (2006.01)

(52) U.S. Cl.
CPC .............................. *G06F 17/30303* (2013.01)

(58) Field of Classification Search
CPC .............. G06F 17/30371; G06F 17/30303; G06F 17/30306; G06F 17/30486; G06F 17/30392; G06F 17/30067; G06F 17/30536; G06F 17/30563; G06F 17/30873; G06F 17/30994
USPC .................................................. 707/690, 691
See application file for complete search history.

(56) References Cited

U.S. PATENT DOCUMENTS

| | | | | |
|---|---|---|---|---|
| 6,868,525 | B1* | 3/2005 | Szabo | G06F 17/30067 705/14.53 |
| 7,882,143 | B2 | 2/2011 | Smyros et al. | |
| 8,732,185 | B1* | 5/2014 | Lynn | G06Q 30/0241 707/750 |
| 2010/0042602 | A1 | 2/2010 | Smyros et al. | |
| 2012/0271813 | A1 | 10/2012 | Shen et al. | |
| 2012/0330946 | A1 | 12/2012 | Arredondo et al. | |

OTHER PUBLICATIONS

Hubmann-Haidvogel, A et al.; "Multiple Coordinated Views for Searching and Navigating Web Content Repositories"; Information Sciences 179 (12). pp. 1813-1821, Jan. 2009.

* cited by examiner

*Primary Examiner* — Usmaan Saeed
*Assistant Examiner* — Fariborz Khoshnoodi
(74) *Attorney, Agent, or Firm* — Patterson + Sheridan, LLP

(57) ABSTRACT

Techniques are disclosed to facilitate consistency between a glossary and a repository, where the glossary includes one or more terms and the repository includes information sets. Each information set includes a definition for a respective term and a range of valid values for the respective term. A request is received to approve a first information set in the repository, where the first information set pertains to a first term in the glossary. The first information set is designated as an active information set for the first term. A subsequent request is received to assign the first term in the glossary to a second information set in the repository, where the second information set is different from the first information set. An information set to designate as the active information set for the first term is programmatically determined based on a predefined consistency criterion.

17 Claims, 8 Drawing Sheets

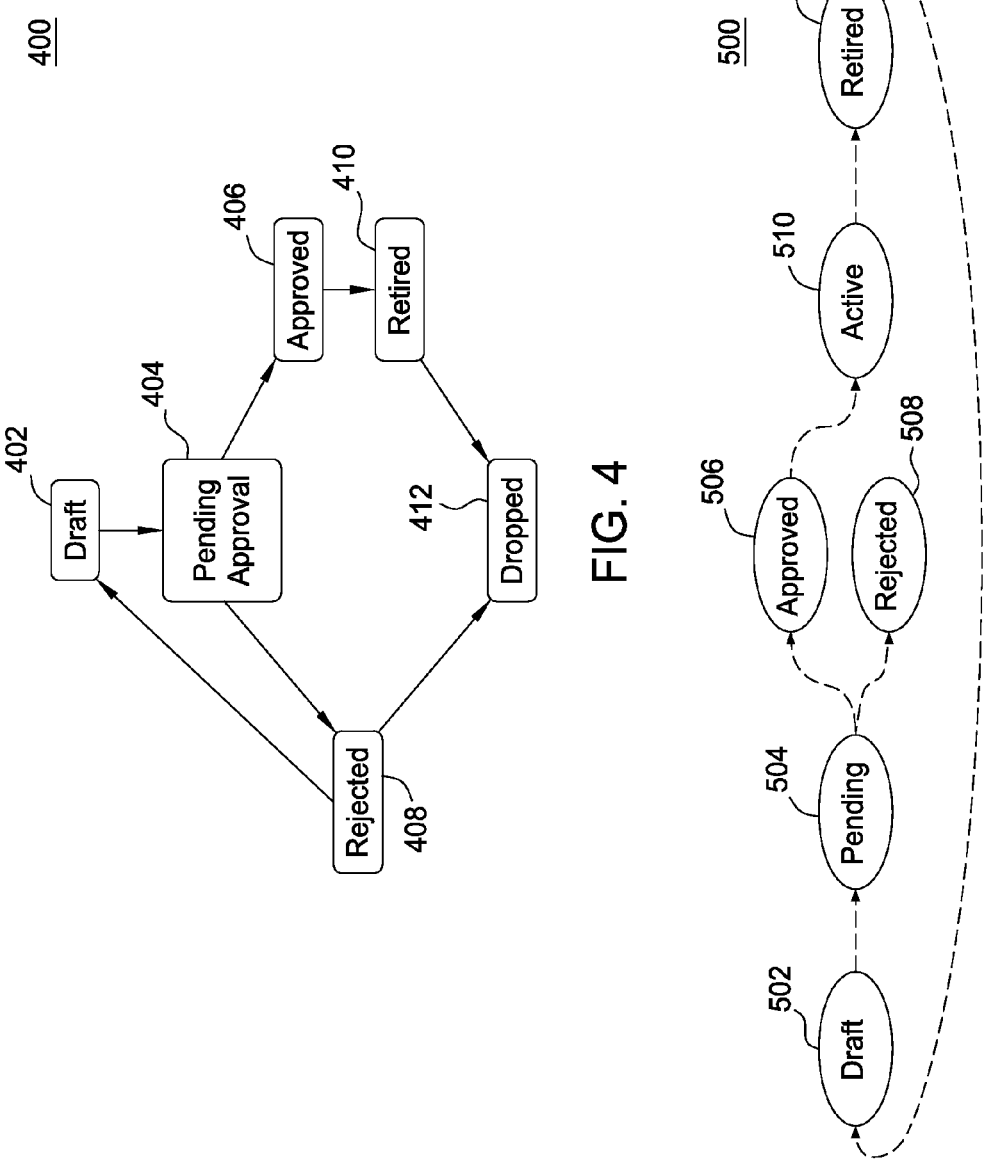

FACILITATING CONSISTENCY BETWEEN A GLOSSARY AND A REPOSITORY

BACKGROUND

1. Field

Embodiments disclosed herein relate to data management. More specifically, embodiments disclosed herein relate to facilitating consistency between a glossary and a repository.

2. Description of the Related Art

Data management is a critical process for any business. Enterprise-level data systems often pay specific attention to key data elements called master data. Master data elements contain high-value business data that is used repeatedly across multiple business process and applications. Name, address, phone number, and date of birth are some common examples of master data associated with customer records.

Master data records are typically synthesized from specific, structured data sources, such as order forms, registration forms, accounting records, and such. These standard sources, while providing key information, capture static data. That is, a customer's name and address are not as fluid or dynamic as customer satisfaction or product enhancements.

Over time, businesses often receive a large quantity of data in unstructured formats that is relevant to master data entries. For example, email correspondence from customers often conveys the customer's level of satisfaction with a product and/or service. These relevant data elements are often ignored because conventional master data models and management systems do not necessarily have the capability to incorporate data from unstructured sources. However, at least in some cases, it is conventionally possible to perform an automated extraction of relevant information from unstructured data, such as through a structured query (e.g., a Structured Query Language (SQL) query). Such extractions are often referred to as data mining.

SUMMARY

Embodiments presented in this disclosure provide a computer-implemented method to facilitate consistency between a glossary and a repository. The glossary includes one or more terms, and the repository includes information sets. Each information set includes a definition for a respective term and a range of valid values for the respective term. The method includes receiving a request to approve a first information set in the repository, where the first information set pertains to a first term in the glossary. The method also includes designating the first information set as an active information set for the first term. The method also includes receiving a subsequent request to assign the first term in the glossary to a second information set in the repository, where the second information set is different from the first information set. The method also includes programmatically determining an information set to designate as the active information set for the first term, based on a predefined consistency criterion. The determined information set is selected from information sets associated with the first term and that include the first information set and the second information set.

Other embodiments presented in this disclosure provide a computer program product to facilitate consistency between the glossary and the repository. The computer program product includes a computer-readable storage medium having program code embodied therewith, the program code executable to receive a request to approve a first information set in the repository, where the first information set pertains to a first term in the glossary. The program code is also executable to designate the first information set as an active information set for the first term. The program code is also executable to receiving a subsequent request to assign the first term in the glossary to a second information set in the repository, where the second information set is different from the first information set. The program code is also executable to programmatically determine an information set to designate as the active information set for the first term, based on a predefined consistency criterion. As stated above, the determined information set is selected from information sets associated with the first term and that include the first information set and the second information set.

Still other embodiments presented in this disclosure provide a system to facilitate consistency between the glossary and the repository. The system includes one or more computer processors and a memory containing a program which, when executed by the one or more computer processors, is configured to perform an operation that includes receiving a request to approve a first information set in the repository, where the first information set pertains to a first term in the glossary. The operation also includes designating the first information set as an active information set for the first term. The operation also includes receiving a subsequent request to assign the first term in the glossary to a second information set in the repository, where the second information set is different from the first information set. The operation also includes programmatically determining an information set to designate as the active information set for the first term, based on a predefined consistency criterion, where the determined information set is selected from information sets associated with the first term and that include the first information set and the second information set.

BRIEF DESCRIPTION OF THE SEVERAL VIEWS OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

FIG. 4 illustrates an example state transition model for a version of an information set, according to one embodiment presented in this disclosure.

FIG. 5 illustrates another example state transition model for a version of an information set, according to an alternative embodiment presented in this disclosure.

DETAILED DESCRIPTION

Figure 1:
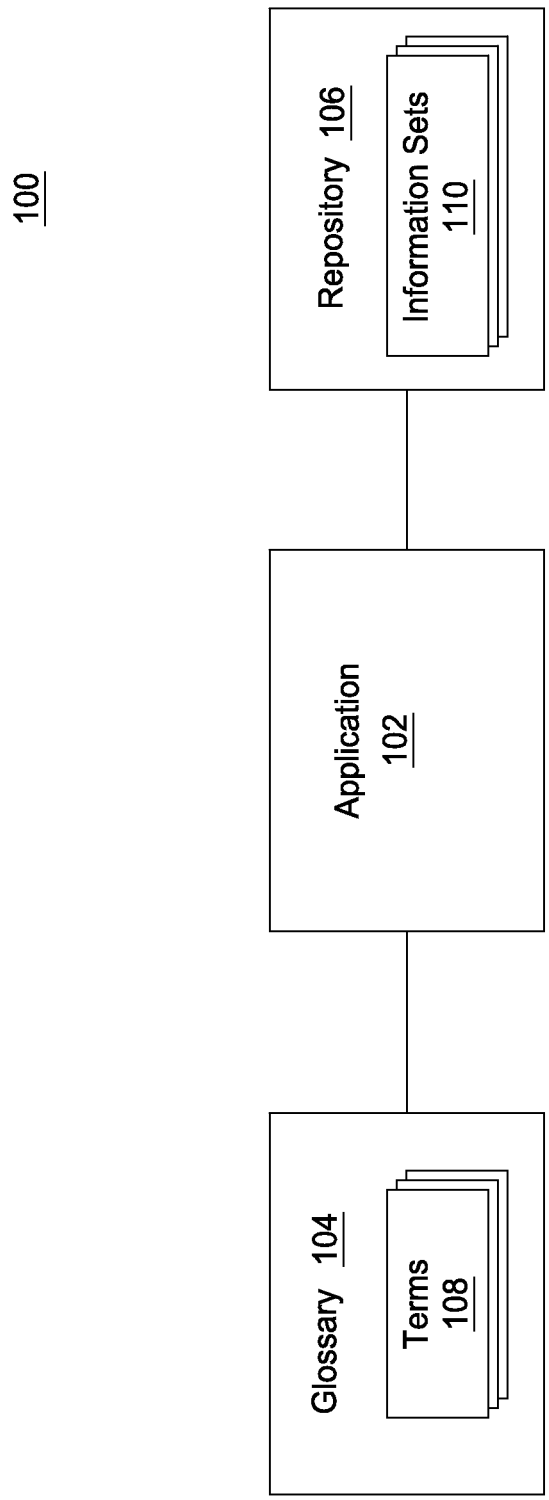
FIG. 1 is a block diagram illustrating a system to enforce linear versioning and state model in a reference data system, according to one embodiment presented in this disclosure.

Although data mining techniques may be used to facilitate managing master data, master data management may also be facilitated in additional ways. For instance, at least some embodiments presented in this disclosure provide techniques to facilitate consistency between a glossary and a repository, where the glossary includes one or more terms, where the repository includes information sets, and where each information set includes a definition for a respective term and a range of valid values for the respective term. In a particular embodiment, the glossary is a business glossary (BG), and the repository is a reference data management (RDM) repository, where reference data is a type of master data. Both the business glossary and reference data are described in further detail below. Master data refers to facts that describe the core of entities, for example, an organization's employees, customers, suppliers, partners, organizations, products, materials, accounts, medical records, locations, and others. Such master data often include valuable information that an organization uses repeatedly across many business processes. Master data may be managed as objects and attributes, and by defining transactions over and access control to the objects and attributes. Data governance procedures may be also defined for functionalities such as conflict resolution, data import and data integration. A master data management (MDM) system may attempt to ensure consistent master information across transactional and analytical systems, address key issues such as data quality and consistency proactively rather than reactively in the data warehouse, decouple master information from individual applications, become a central, application-independent resource, and simplify ongoing integration tasks and new application development.

In one embodiment, reference data, which as described above is a type of master data, is used to categorize other data present in an enterprise and that is referenced across multiple systems in the enterprise. Further, a reference data set includes a collection of reference data values. Reference data may be associated with different integration scenarios, such as one that ties a glossary with reference data. In this integration scenario, a glossary term may be linked to an associated range of valid values, where the valid values are defined by an RDM system in the form of a reference data set that is stored in an RDM repository. An example of a particular glossary is a business glossary, which is often used by organizations to manage a controlled vocabulary of terms used across the enterprise. At least in some embodiments, a tool is provided that is configured to facilitate creating and managing a controlled vocabulary and classification system. Besides maintaining a vocabulary, the tool may also provide a way to assign assets to a taxonomy of terms and categories. In one embodiment, a data steward may use an RDM tool providing reference data management capabilities, in order to take reference data sets through various lifecycle phases and/or create various versions of a base set. Example lifecycle phases include draft, approved, active, dropped, retired, etc.

FIG. 1 is a block diagram illustrating a system 100 to enforce linear versioning and state model in a reference data system, according to one embodiment presented in this disclosure. As shown, the system 100 includes an application 102. In one embodiment, the application 102 is configured to facilitate consistency between a glossary 104 and a repository 106. The glossary 104 includes terms 108, and the repository 106 includes information sets 110. As stated above, each information set, also referred to as a reference data (RD) set, includes a definition for a respective term and a range of valid values for the respective term. In some instances, an assignment of a term to an information set specifying a set of valid values for the term, may subsequently become inconsistent when the corresponding reference data set is modified by the data steward as part of a lifecycle operation. The assignment may also be referred to herein as a term-to-valid-values assignment. Accordingly, one embodiment provides a predefined state lifecycle and versioning model and associated algorithms, which are further described below, in order to resolve such inconsistencies. Depending on the embodiment, the inconsistencies may be resolved without requiring user input or only requiring a reduced amount of user input, relative to alternative approaches that do not involve the predefined state lifecycle and versioning model.

Figure 2:
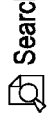
FIG. 2 depicts a graphical user interface (GUI) screen showing information associated with a business term, according to one embodiment presented in this disclosure.

FIG. 2 depicts a graphical user interface (GUI) screen 200 showing information associated with a business term, according to one embodiment presented in this disclosure. As shown, the GUI screen 200 includes information in the form of attributes 202 for the business term "service oriented infrastructure (SOI) country". The attributes 202 include a name, a short description, a long description, a parent category, a steward, a status. For instance, the short description indicates that the SOI country business term provides a mapping of two-letter International Standards Organization (ISO) country codes to three-letter ISO country codes. The attributes 202 further include term properties 216 such a modifier flag, a type, a creating user, a creation date, a modifying user, and a modified date. The term properties 216 also include an information set designation 218, also referred to as a valid values designation. As shown, the information set designation 218 associates the SOI country business term with a corresponding information set defined in the RDM system. Depending on the embodiment, the association may also include a hyperlink to a GUI screen displaying information pertaining to the corresponding information set. In this particular example, the corresponding information set is the RDM SOI country code set.

Figure 3:
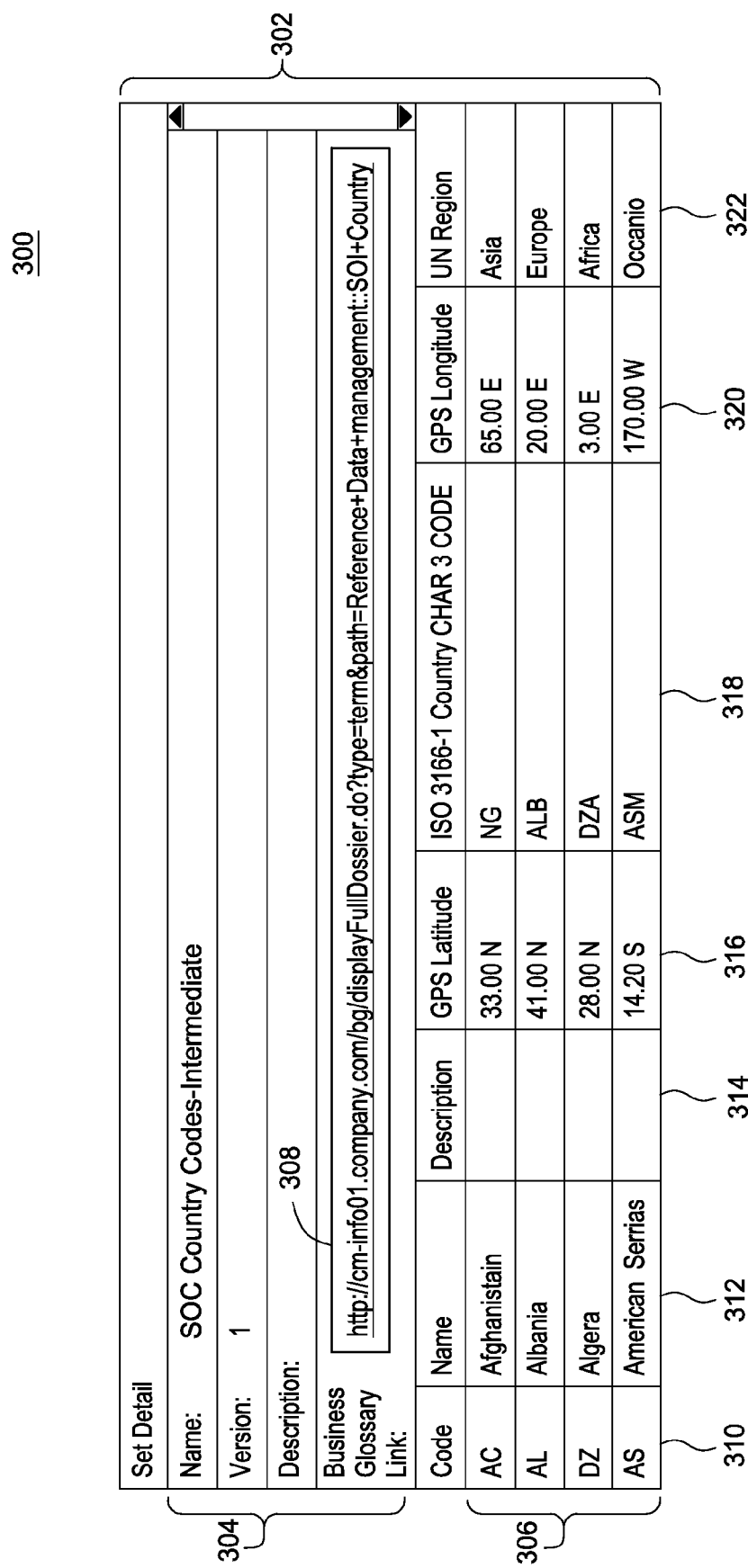
FIG. 3 depicts a GUI screen showing information associated with the information set corresponding to the business term, according to one embodiment presented in this disclosure.

FIG. 3 depicts a GUI screen 300 showing information associated with the information set corresponding to the business term, according to one embodiment presented in this disclosure. As shown, the GUI screen 300 includes information 302 in the form of attributes 304 and set properties 306. The attributes 304 include a name, a version identifier, and a description. The attributes 304 also include a business term designation 308. As shown, the business term designation 308 associates the RDM SOI country code set with the SOI country business term. Depending on the embodiment, the association may also include a hyperlink to a GUI screen displaying information pertaining to the SOI country business term, such as the GUI screen 200. In some embodiments, that a business term is associated with a country code set on the business term GUI screen necessarily means that the country code set is associated with the business term on the information set GUI screen. In alternative embodiments, that a business term is associated with a country code set on the business term GUI screen does not necessarily mean that the country code set is associated with the business term on the information set GUI screen; in such instances, the information set GUI screen reflects the association only when the country code set is separately and explicitly associated with the business term at least for purposes of the information set GUI screen.

In the particular example shown, the set properties 306 include a two-letter ISO country code 310, a country name 312, an optional country description 314, a global positioning system (GPS) latitude, a three-letter ISO country code 318, and a GPS longitude 320. For instance, the set properties 306 specify that the country Afghanistan, having the two-letter ISO country code of "AF" and the three-letter ISO country code of "AFG", is a valid value for the SOI country business term. The set properties 306 further specify that the country Albania, having the two-letter ISO country code of "AL" and the three-letter ISO country code of "ALB", is another valid value for the SOI country business term. At least in some embodiments, any value that does not correspond to at least one entry in the set properties 306 is deemed to be an invalid value for the given business term.

In one embodiment, assignments from the terms in a glossary to respective sets of valid values are static and may become inconsistent if the set that includes the valid values undergoes a certain lifecycle operation, e.g., updating the reference data set to a new version with new values that may not necessarily be consistent or compatible with the associated term in the glossary. In other embodiments, the assignments may also expire if the set undergoes a certain lifecycle operation, e.g., expiry of the reference data set. At least in some cases, it may be unfeasible to facilitate consistency of assignments without manual intervention from the business glossary steward and/or the RDM steward. Using the techniques disclosed herein, however, may facilitate consistency of assignments with reduced or eliminated manual intervention on the part of the business glossary steward and the RDM steward. For instance, the techniques disclosed herein help ensure that an association from a term to an information set is still pointing to a valid value range even after the information set undergoes a state change in the RDM system. In some embodiments, the consistency of assignments is further improved by learning from an existing knowledge base of how an initially assigned information set of valid values is related to other information sets and/or versions thereof.

In one embodiment, a versioning model, lifecycle states, and associated constraints are provided to manage a historical superset of valid values for a term and such that at any given point in time, either an appropriate information set is designated as being active or outlying values are properly accounted for at least in a semi-automated manner and as further described below. Accordingly, one embodiment provides a versioning and state transition model described as follows. Specifically, each information set is permitted to have multiple versions thereof. Each of the versions includes a respective set of reference data values, and a new version can differ from a previous version via a predefined operation selected from a difference operation, an addition operation, and an update operation. The difference operation generates a new version of an information set by removing undesired values from the information set. The addition operation generates a new version of an information set by adding values to the information set. The update operation generates a new version of an information set by updating existing values from the information set.

FIG. 4 illustrates an example state transition model 400 for a version of an information set, according to one embodiment presented in this disclosure. In one embodiment, each version of an information set is permitted to undergo state transitions based on a predefined state transition model such as the state transition model 400. The state transition model 400 has multiple states, each representing a distinct phase in a lifecycle of a version of an information set. As shown, the states include, without limitation, draft 402, pending approval 404, approved 406, rejected 408, retired 410, and dropped 412. The state names and semantics, transitions therebetween, and number of states may be tailored to suit the needs of a particular case.

FIG. 5 illustrates another example state transition model 500 for a version of an information set, according to an alternative embodiment presented in this disclosure. As with the state transition model 400, the state transition model 500 has multiple states, each representing a distinct phase in a lifecycle of a version of an information set. As shown, the states include draft 502, pending 504, approved 506, rejected 508, active 510, and retired 512. In one embodiment, active 510 indicates that the version of the information set is considered active for purposes of accessed by an external system through the association from the term in the glossary. Depending on the embodiment, the active state may be defined in different ways to handle different scenarios. For example, in a first embodiment, referred to as the implicit definition embodiment, if the "active" state is implicitly defined as being a most current, approved version of an information set, then whichever approved information set is most current is designated as the active information set. In order to determine which information set is most current, aspects of information sets may be taken into account, such as effective timestamp, expiry timestamp, last-modified timestamp, etc. In a second embodiment, referred to as the explicit declaration embodiment, the "active" state is explicitly declared as a singleton state, in which case if a given version is designated as being active, no other version may be active at the same time.

In one embodiment, when associating a term in the glossary with a given version of an information set in the repository, the version of the information set transitions to the active state and becomes accessible via the association. At this stage, the association between the glossary and the repository is consistent. In order to facilitate consistency between the glossary and the repository, a predefined algorithm such as the constraint enforcement algorithm discussed below may be applied. In one embodiment, the constraint enforcement algorithm includes one or more rules specifying that if an active version of a given information set exists and one or more new versions are created and designated as "approved", the application 102 looks up a predefined rule pertaining to the "active" state and takes one of the following actions.

In one embodiment, if the "active" state is defined by the implicit definition embodiment described above, the application 102 performs the following sequence of steps. First, the application 102 accesses the effective date of each version and eliminates, as candidates, those versions having an effective date later than the current date, e.g., those versions that have yet to take effect. Next, the application 102 accesses the expiry date of each version and eliminates, as candidates, those versions having an expiry date prior than the current date, e.g., those versions that have already expired. Then, the application 102 accesses the last-modified timestamp of each version and selects the version with the latest timestamp, to designate as being the active information set.

On the other hand, if the "active" state is defined by the explicit declaration embodiment described above, the application 102 prompts a user to indicate, via user input, a desired version to designate as being "active". Based on the user input, the application 102 designates the desired version as being active and transitions every other version out of its respective, active state.

In the scenario where an active version of a given information set is present, where one or more new versions are present, and where the resulting state is such that none of the versions is designated as approved, then the application 102 determines if an association to a term in the glossary exists and notifies the user about the association being potentially inconsistent. If the "active" state is defined by the implicit definition embodiment described above, the application 102 prompts the user to approve at least one of the versions. On the other hand, if the "active" state is defined by the explicit declaration embodiment described above, then the application 102 prompts the user to indicate a desired version to designate as active.

In one embodiment, the application 102 applies one or more additional rules to programmatically generate suggestions on whether a user should reconsider associating a glossary term to a newly approved version of an information set, e.g., dissociating the glossary term from the newly approved version and/or associating the glossary term to another information set version. If it is the case that an active version of the information set is present, that one or more new versions are present, and that lifecycle actions are performed such that one of the new versions is active, then the application 102 performs the following actions. If a difference operation was used to generate the new version, e.g., some valid values have been removed, then the application 102 computes the count of differences and, if the count exceeds a predefined suggestion threshold for the difference operation, prompts the user to reconsider the association. If an addition operation was used to generate the new version, then the application 102 computes the count of additions and, if the count exceeds a predefined suggestion threshold for the addition operation, prompts the user to reconsider the association. Depending on the embodiment, the aforementioned suggestion thresholds may be the same or different in measure. If an update operation was used to generate the new version—e.g., all the original values are retained, and only properties may possibly be affected—then the application 102 does not provide any suggestion to the user.

In one embodiment, the application 102 is also configured to provide a feedback mechanism. Depending on whether the business glossary user (or steward) accepts or rejects suggestions on reconsidering associations, the application 102 computes a confidence measure and associates it with the profile of the RDM user (or steward) who made the changes in the RDM repository in terms of creating new versions.

To that end, the application 102 first initializes a confidence measure to zero for all RDM users. If it is the case that the RDM user performed a difference operation to create the new version of a set and that the BG user modified the association, then the application 102 increments a confidence measure for steward B by a predefined value herein referred to as delta. If the confidence measure exceeds a maximum confidence threshold for the difference operation, then the application 102 decrements the suggestion threshold for the difference operation, by a predefined threshold adjustment value, e.g., 0.1. Accordingly, if it is the case that a given RDM user is making changes in the RDM repository and that programmatically notifying a given BG user about the changes often results in the BG user changing the BG-RDM associations, then it may warrant lowering the suggestion threshold such that these suggestions are generated more frequently responsive to similar changes subsequently made by this particular RDM user.

If it is the case that the RDM user performed a difference operation to create the new version of a set and that the BG user did not modify the association, then the application 102 decrements the confidence measure for the BG user by delta. If the confidence measure is less than a minimum confidence threshold for the difference operation, then the application 102 increments the suggestion threshold for the difference operation, by the threshold adjustment value. Accordingly, if it is the case that a given RDM user is making changes in the RDM repository and that notifying the BG user about those changes often results in the BG user not changing the BG-RDM associations, then it may warrant raising the suggestion threshold such that these suggestions are generated less frequently responsive to similar changes subsequently made by this particular RDM user.

If it is the case that the RDM user performed an addition operation to create the new version of a set and that the BG user modified the association, then the application 102 increments the confidence measure for the BG user by delta. If the confidence measure exceeds a maximum confidence threshold for the addition operation, then the application 102 decrements the suggestion threshold for the addition operation, by the threshold adjustment value. Accordingly, if it is the case that an RDM user is making changes in the RDM repository and that notifying the BG user about those changes often results in the BG user changing the BG-RDM linkages, then it may warrant lowering the suggestion threshold such that these suggestions are generated more frequently responsive to similar changes subsequently made by this particular RDM user.

If it is the case that the RDM user performed an addition operation to create the new version of a set and that the BG user did not modify the association, then the application 102 decrements the confidence measure for the BG user by delta. If the confidence measure is less than a minimum confidence threshold for the addition operation, then the application 102 decrements the suggestion threshold for the addition operation, by the threshold adjustment value. Accordingly, if it is the case that an RDM user is making changes in the RDM repository and that notifying the BG user about those changes often results in the BG user not changing the BG-RDM associations, then it may warrant raising the suggestion threshold such that these suggestions are generated less frequently responsive to similar changes subsequently made by this particular RDM user. The maximum confidence thresholds, minimum confidence thresholds, delta, suggestions thresholds, threshold adjustment value, and delta may be tailored to suit the needs of a particular case.

Figure 6:
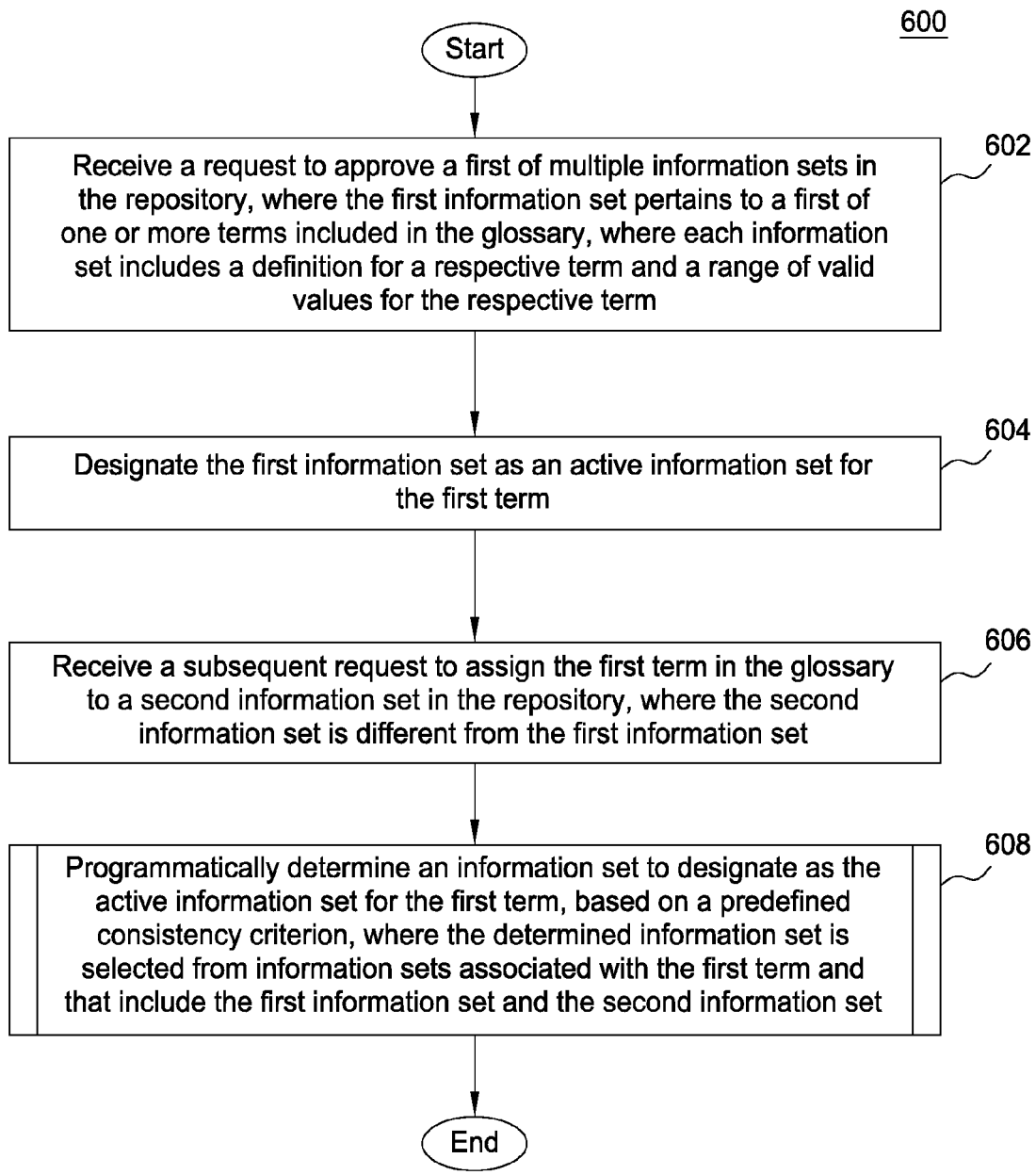
FIG. 6 is a flowchart depicting a method to facilitate consistency between a glossary and a repository, according to one embodiment presented in this disclosure.

FIG. 6 is a flowchart depicting a method 600 to facilitate consistency between a glossary and a repository, according to one embodiment presented in this disclosure. As stated above, the glossary includes one or more terms, and the repository includes information sets, where each information set includes a definition for a respective term and a range of valid values for the respective term. As shown, the method 600 begins at step 602, where the application 102 receives a request to approve a first information set in the repository, where the first information set pertains to a first term in the glossary. At step 604, the application 102 designates the first information set as an active information set for the first term. At step 606, the application 102 receives a subsequent request to assign the first term in the glossary to a second information set in the repository, where the second information set is different from the first information set.

At step 608, the application 102 programmatically determines an information set to designate as the active information set for the first term, based on a predefined consistency criterion. In one embodiment, the predefined consistency criterion specifies to determine the information set by evaluating properties of each information set in the plurality of information sets associated with the first term. Depending on the embodiment, the properties may include an effective date, an expiry date, and a last-modified timestamp.

At least in some embodiments, the determined information set is not the second information set. In a particular embodiment, the determined information set is a third information set associated with the first term, where the first, second, and third information sets are distinct, where the third information set is designated as the active information set for the first term without receiving any request explicitly specifying to designate the third information set as the active information set for the first term, where the first information set is designated as not being the active information set for the first term. The determined information set is selected from information sets associated with the first term, the information sets including the first information set and the second information set.

In some embodiments, each information set has a respective lifecycle state selected from a draft state, a pending state, an approved state, a rejected state, a retired state, and a dropped state. Further, each information set has a respective status selected from an active status, an inactive status, a singleton active status, and a singleton inactive status. Further still, the glossary is a business glossary (BG) having an associated BG data steward, and the repository comprises a reference data management (RDM) repository having an associated RDM data steward.

The step 608 is further described below in conjunction with FIG. 8. After the step 608, the method 600 terminates. At least in some embodiments, the method 600 thereby facilitates consistency between the glossary and the repository and reducing intervention from data stewards of the glossary and of the repository, respectively.

Figure 7:
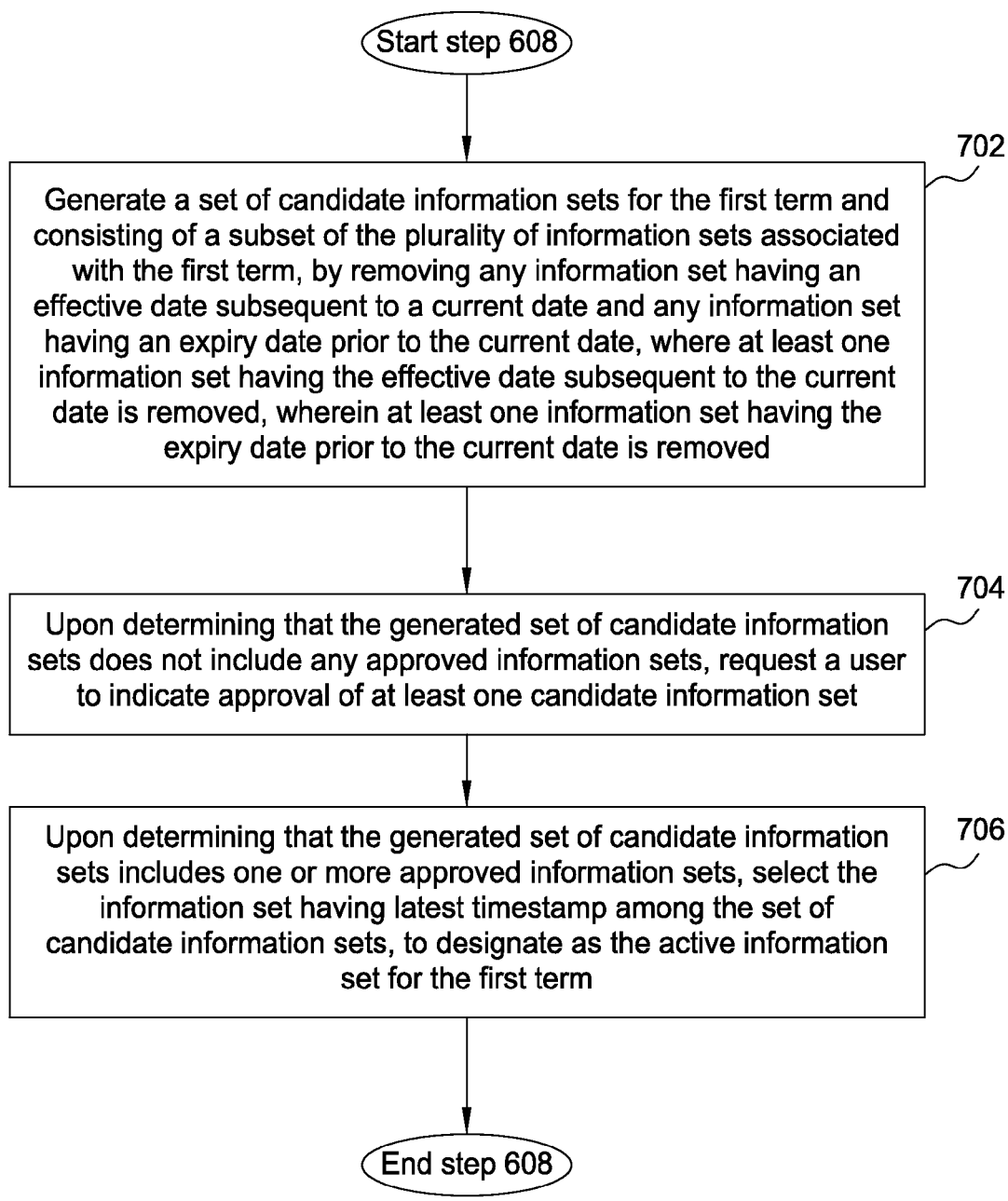
FIG. 7 is a flowchart depicting a method to programmatically determine an information set to designate as the active information set for a given term, according to one embodiment presented in this disclosure.

FIG. 7 is a flowchart depicting a method 700 to programmatically determine an information set to designate as the active information set for a given term, according to one embodiment presented in this disclosure. The method 700 corresponds to the step 608 of FIG. 6. As shown, the method 700 begins at step 702, where the application 102 generates a set of candidate information sets for the first term and consisting of a subset of the information sets associated with the first term. The set of candidate information sets is generated by removing any information set having an effective date subsequent to a current date and any information set having an expiry date prior to the current date. In one embodiment, at least one information set having the effective date subsequent to the current date is removed. Additionally or alternatively, at least one information set having the expiry date prior to the current date is removed. At step 704, upon determining that the generated set of candidate information sets does not include any approved information sets, the application 102 requests a user to approve at least one candidate information set. At step 706, upon determining that the generated set of candidate information sets includes one or more approved information sets, the application 102 selects the information set having the latest timestamp among the set of candidate information sets, to designate as the active information set for the first term. After the step 706, the method 700 terminates.

Figure 8:
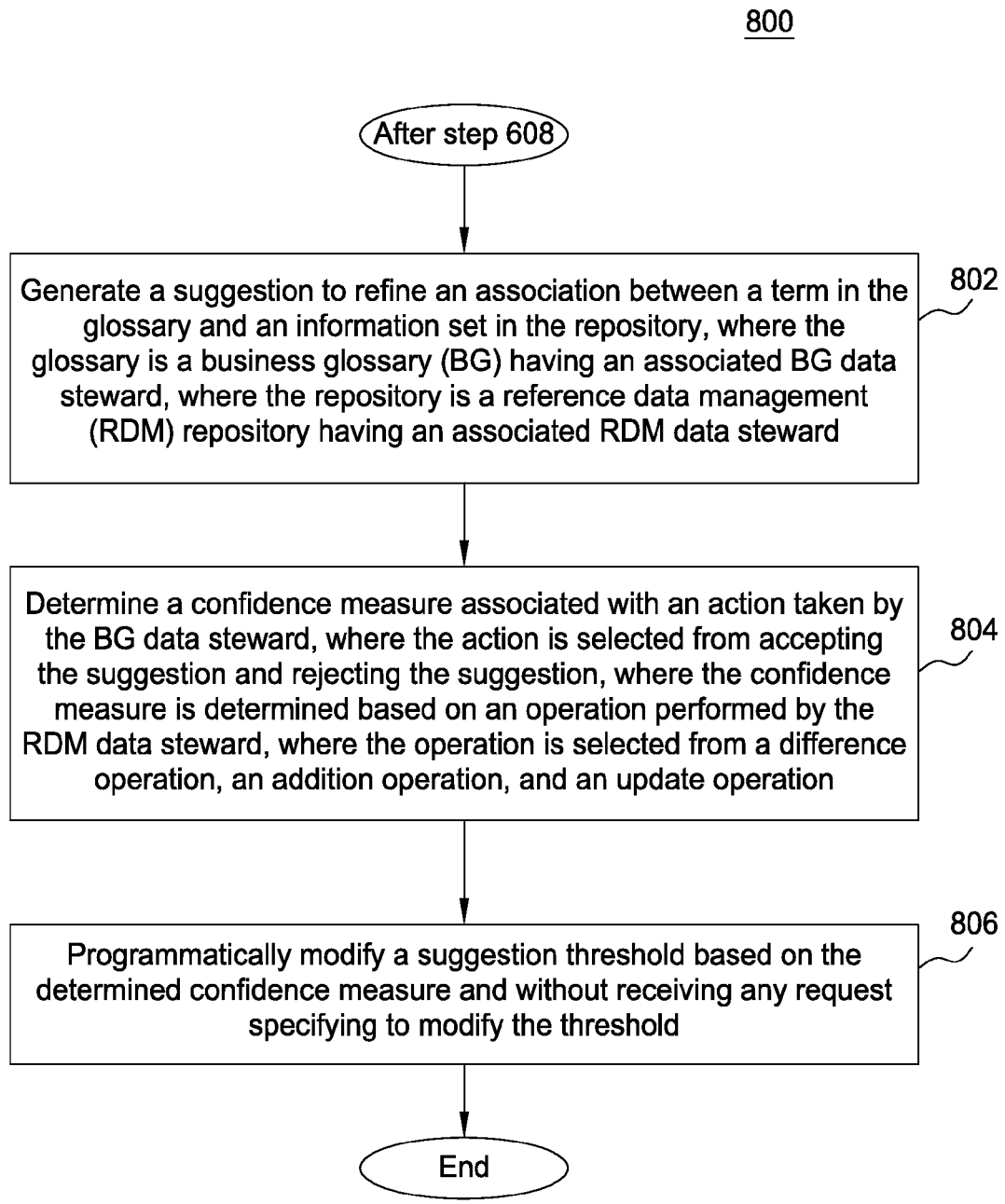
FIG. 8 is a flowchart depicting a method to facilitate refinement of associations between the glossary and the repository, according to one embodiment presented in this disclosure.

FIG. 8 is a flowchart depicting a method 800 to facilitate refinement of associations between the glossary and the repository, according to one embodiment presented in this disclosure. In one embodiment and without limitation, the method 800 is performed after the step 608 of FIG. 6. As shown, the method 800 begins at step 802, where the application 102 generates a suggestion to refine an association between a term in the glossary and an information set in the repository. At step 804, the application 102 determines a confidence measure associated with an action taken by the BG data steward. The action is selected from accepting the suggestion and rejecting the suggestion, and the confidence measure is determined based on an operation performed by the RDM data steward. The operation performed by the RDM data steward is selected from a difference operation, an addition operation, and an update operation. At step 806, the application 102 programmatically modifies a suggestion threshold based on the determined confidence measure and without receiving any request specifying to modify the threshold. After the step 806, the method 800 terminates.

Accordingly, embodiments presented in this disclosure provide techniques to facilitate consistency between a glossary and a repository. At least some embodiments provide a predefined state lifecycle and versioning model and associated algorithms in order to resolve inconsistencies in term-to-valid-values assignments. Consequently, the inconsistencies may be resolved with a reduced amount of required user input relative to alternative approaches.

Figure 9:
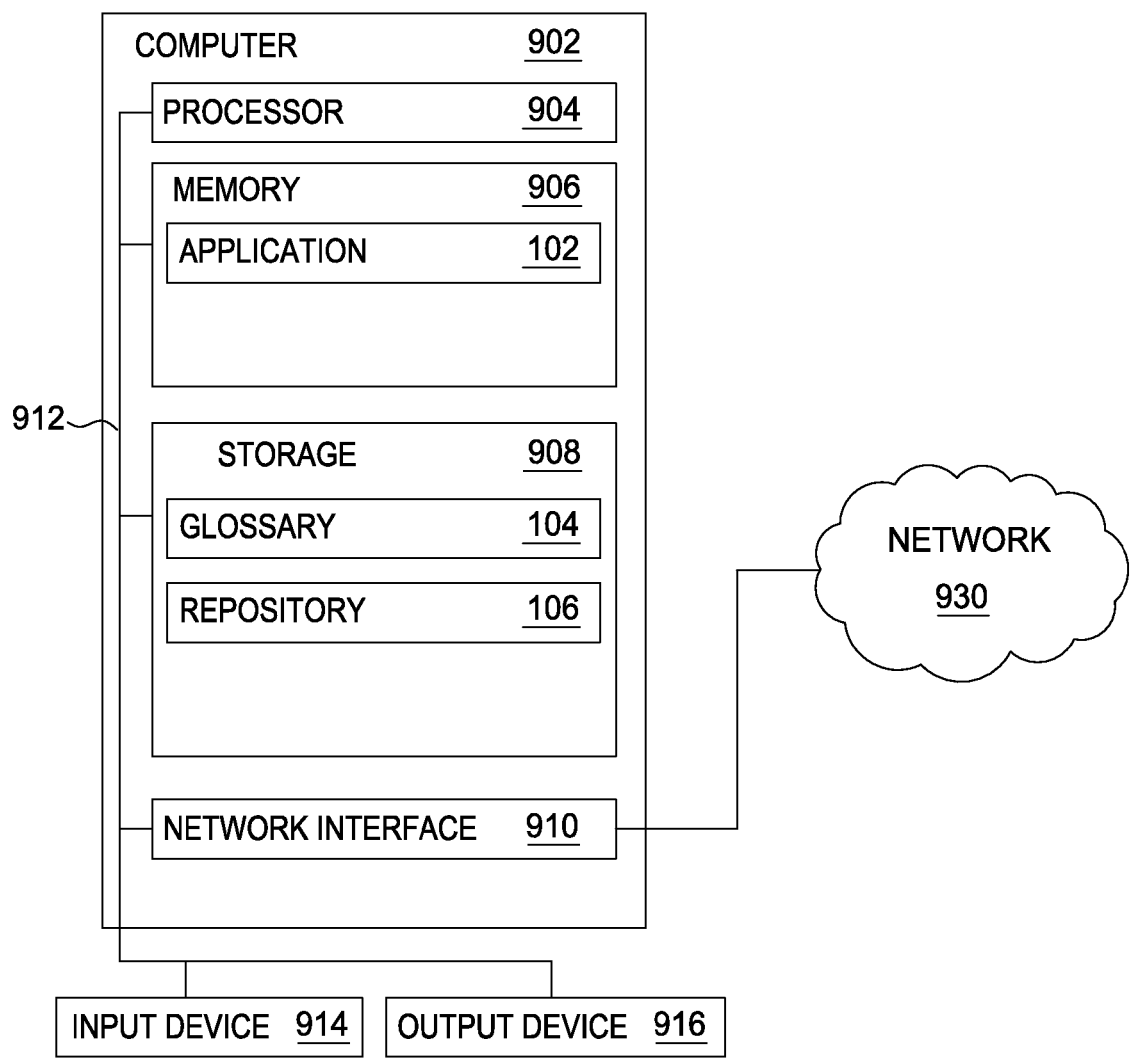
FIG. 9 is a block diagram illustrating components of a system configured to facilitate consistency between a glossary and a repository, according to one embodiment presented in this disclosure.

FIG. 9 is a block diagram illustrating components of a system 900 configured to facilitate consistency between a glossary and a repository, according to one embodiment presented in this disclosure. The system 900 includes a computer 902 configured to connect to other computers via a network 930. In general, the network 930 may be a telecommunications network and/or a wide area network (WAN). In a particular embodiment, the network 930 is the Internet.

The computer 902 generally includes a processor 904 connected via a bus 912 to a memory 906, a network interface device 910, a storage 908, an input device 914, and an output device 916. The computer 902 is generally under the control of an operating system. Examples of operating systems include UNIX, versions of the Microsoft Windows® operating system, and distributions of the Linux® operating system. More generally, any operating system supporting the functions disclosed herein may be used. The processor 904 is included to be representative of a single CPU, multiple CPUs, a single CPU having multiple processing cores, and the like. Similarly, the memory 906 may be a random access memory. While the memory 906 is shown as a single identity, it should be understood that the memory 906 may comprise a plurality of modules, and that the memory 906 may exist at multiple levels, from high speed registers and caches to lower speed but larger DRAM chips. The network interface device 910 may be any type of network communications device allowing the computer 902 to communicate with other computers via the network 930.

The storage 908 may be a persistent storage device. Although the storage 908 is shown as a single unit, the storage 908 may be a combination of fixed and/or removable storage devices, such as fixed disc drives, solid state drives, floppy disc drives, tape drives, removable memory cards or optical storage. The memory 906 and the storage 908 may be part of one virtual address space spanning multiple primary and secondary storage devices.

The input device 914 may be any device for providing input to the computer 902. For example, a keyboard and/or a mouse may be used. The output device 916 may be any device for providing output to a user of the computer 902. For example, the output device 916 may be any conventional display screen or set of speakers. Although shown separately from the input device 914, the output device 916 and input device 914 may be combined. For example, a display screen with an integrated touch-screen may be used.

As shown, the memory 906 of the computer 902 includes the application 102, and the storage 908 includes the glossary 104 and the repository 106. By configuring the application 102 according to the techniques disclosed herein, inconsistencies in term-to-valid-values assignments between a glossary and a repository may be resolved more efficiently and/or accurately at least in some cases.

In the preceding, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects presented in this disclosure may be embodied as a system, method or computer program product. Accordingly, aspects disclosed herein may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects disclosed herein may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this disclosure, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects disclosed herein may be written in any combination of one or more programming languages, including an object oriented programming language such as Java, Smalltalk, C++ or the like and conventional procedural programming languages, such as the "C" programming language or similar programming languages. The program code may execute entirely on the computer of a user, partly on the computer of the user, as a stand-alone software package, partly on the computer of the user and partly on a remote computer, or entirely on the remote computer or server. In the latter scenario, the remote computer may be connected to the computer of the user via any type of network, including a local area network (LAN) or a wide area network (WAN), or the connection may be made to an external computer (for example, through the Internet using an Internet Service Provider).

Aspects presented in this disclosure are described above with reference to flowchart illustrations or block diagrams of methods, apparatus (systems) and computer program products according to embodiments disclosed herein. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g., an amount of storage space consumed by a user or a number of virtualized systems instantiated by the user). A user can access any of the resources that reside in the cloud at any time, and from anywhere across the Internet. In context of the embodiments presented herein, the application 102 may execute in the cloud, and the glossary 104 and repository 106 may also be stored in the cloud. The application may resolve inconsistencies in term-to-valid-values assignments and according to the techniques disclosed herein. Thus, the user may access the application 102 and the assignments, from any computing system attached to a network connected to the cloud (e.g., the Internet) and be charged based on the processing environment(s) used.

The flowchart and block diagrams in the Figures illustrate the architecture, functionality, and operation of possible implementations of systems, methods and computer program products according to various embodiments disclosed herein. In this regard, each block in the flowchart or block diagrams may represent a module, segment, or portion of code, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams or flowchart illustration, and combinations of blocks in the block diagrams or flowchart illustration, can be implemented by special-purpose hardware-based systems that perform the specified functions or acts, or combinations of special purpose hardware and computer instructions.

While the foregoing is directed to embodiments presented in this disclosure, other and further embodiments may be devised without departing from the basic scope of contemplated embodiments, and the scope thereof is determined by the claims that follow.

What is claimed is:

1. A computer-implemented method to facilitate consistency between a glossary and a repository, wherein the glossary includes one or more terms, wherein the repository includes a plurality of information sets, wherein each information set includes a definition for a respective term and a range of valid values for the respective term, the method comprising:
    receiving a request to approve a first information set in the repository, wherein the first information set pertains to a first term in the glossary;
    designating the first information set as an active information set for the first term;
    receiving a subsequent request to assign the first term in the glossary to a second information set in the repository, wherein the second information set is different from the first information set; and
    programmatically determining an information set to designate as the active information set for the first term, based on a predefined consistency criterion and by operation of one or more computer processors, wherein the determined information set is selected from a plurality of information sets associated with the first term, the plurality of information sets including the first information set and the second information set, wherein the predefined consistency criterion specifies to determine the information set by evaluating a plurality of properties of each information set in the plurality of information sets associated with the first term, wherein the plurality of properties include an effective date, an expiry date, and a last-modified timestamp, and wherein the determined information set is not the second information set.

2. The computer-implemented method of claim 1, wherein the determined information set is a third information set associated with the first term, wherein the first, second, and third information sets are distinct, wherein the third information set is designated as the active information set for the first term without receiving any request explicitly specifying to designate the third information set as the active information set for the first term, wherein the first information set is designated as not being the active information set for the first term.

3. The computer-implemented method of claim 2, wherein programmatically determining the information set to designate as the active information set for the first term comprises:
    generating a set of candidate information sets for the first term and consisting of a subset of the plurality of information sets associated with the first term, by removing any information set having an effective date subsequent to a current date and any information set having an expiry date prior to the current date, wherein at least one information set having the effective date subsequent to the current date is removed, wherein at least one information set having the expiry date prior to the current date is removed;
    upon determining that the generated set of candidate information sets does not include any approved information sets, requesting a user to approve at least one candidate information set; and
    upon determining that the generated set of candidate information sets includes one or more approved information sets, selecting the information set having the latest timestamp among the set of candidate information sets, to designate as the active information set for the first term.

4. The computer-implemented method of claim 3, thereby facilitating consistency between the glossary and the repository and reducing intervention from data stewards of the glossary and of the repository, respectively, wherein each information set has a respective lifecycle state selected from a draft state, a pending state, an approved state, a rejected state, a retired state, and a dropped state, wherein each information set has a respective status selected from an active status, an inactive status, a singleton active status, and a singleton inactive status.

5. The computer-implemented method of claim 4, wherein the glossary comprises a business glossary (BG) having an associated BG data steward, wherein the repository comprises a reference data management (RDM) repository having an associated RDM data steward, wherein the method further comprises:
    generating a suggestion to refine an association between a term in the glossary and an information set in the repository.

6. The computer-implemented method of claim 5, further comprising:
    determining a confidence measure associated with an action taken by the BG data steward, wherein the action is selected from accepting the suggestion and rejecting the suggestion, wherein the confidence measure is determined based on an operation performed by the RDM data steward, wherein the operation is selected from a difference operation, an addition operation, and an update operation; and programmatically modifying a suggestion threshold based on the determined confidence measure and without receiving any request specifying to modify the threshold;

wherein the action is, in respective instances, accepting the suggestion and rejecting the suggestion, wherein the operation is, in respective instances, the difference operation, the addition operation, and the update operation.

7. A computer program product to facilitate consistency between a glossary and a repository, wherein the glossary includes one or more terms, wherein the repository includes a plurality of information sets, wherein each information set includes a definition for a respective term and a range of valid values for the respective term, the computer program product comprising:

a computer-readable storage medium having program code embodied therewith, the program code executable by one or more computer processors to:

receive a request to approve a first information set in the repository, wherein the first information set pertains to a first term in the glossary;

designate the first information set as an active information set for the first term;

receive a subsequent request to assign the first term in the glossary to a second information set in the repository, wherein the second information set is different from the first information set; and programmatically determine an information set to designate as the active information set for the first term, based on a predefined consistency criterion, wherein the determined information set is selected from a plurality of information sets associated with the first term, the plurality of information sets including the first information set and the second information set, wherein the predefined consistency criterion specifies to determine the information set by evaluating a plurality of properties of each information set in the plurality of information sets associated with the first term, wherein the plurality of properties include an effective date, an expiry date, and a last-modified timestamp, wherein the determined information set is not the second information set.

8. The computer program product of claim 7, wherein the determined information set is a third information set associated with the first term, wherein the first, second, and third information sets are distinct, wherein the third information set is designated as the active information set for the first term without receiving any request explicitly specifying to designate the third information set as the active information set for the first term, wherein the first information set is designated as not being the active information set for the first term.

9. The computer program product of claim 8, wherein programmatically determining the information set to designate as the active information set for the first term comprises:

generating a set of candidate information sets for the first term and consisting of a subset of the plurality of information sets associated with the first term, by removing any information set having an effective date subsequent to a current date and any information set having an expiry date prior to the current date, wherein at least one information set having the effective date subsequent to the current date is removed, wherein at least one information set having the expiry date prior to the current date is removed;

upon determining that the generated set of candidate information sets does not include any approved information sets, requesting a user to approve at least one candidate information set; and upon determining that the generated set of candidate information sets includes one or more approved information sets, selecting the information set having the latest timestamp among the set of candidate information sets, to designate as the active information set for the first term.

10. The computer program product of claim 9, thereby facilitating consistency between the glossary and the repository and reducing intervention from data stewards of the glossary and of the repository, respectively, wherein each information set has a respective lifecycle state selected from a draft state, a pending state, an approved state, a rejected state, a retired state, and a dropped state, wherein each information set has a respective status selected from an active status, an inactive status, a singleton active status, and a singleton inactive status.

11. The computer program product of claim 10, wherein the glossary comprises a business glossary (BG) having an associated BG data steward, wherein the repository comprises a reference data management (RDM) repository having an associated RDM data steward, wherein the program code is further executable to:

generate a suggestion to refine an association between a term in the glossary and an information set in the repository.

12. The computer program product of claim 11, wherein the program code is further executable to:

determine a confidence measure associated with an action taken by the BG data steward, wherein the action is selected from accepting the suggestion and rejecting the suggestion, wherein the confidence measure is determined based on an operation performed by the RDM data steward, wherein the operation is selected from a difference operation, an addition operation, and an update operation; and programmatically modify a suggestion threshold based on the determined confidence measure and without receiving any request specifying to modify the threshold;

wherein the action is, in respective instances, accepting the suggestion and rejecting the suggestion, wherein the operation is, in respective instances, the difference operation, the addition operation, and the update operation.

13. A system to facilitate consistency between a glossary and a repository, wherein the glossary includes one or more terms, wherein the repository includes a plurality of information sets, wherein each information set includes a definition for a respective term and a range of valid values for the respective term, the system comprising:

one or more computer processors; and a memory containing a program which, when executed by the one or more computer processors, is configured to perform an operation comprising:

receiving a request to approve a first information set in the repository, wherein the first information set pertains to a first term in the glossary, designating the first information set as an active information set for the first term, receiving a subsequent request to assign the first term in the glossary to a second information set in the repository, wherein the second information set is different from the first information set, and programmatically determining an information set to designate as the active information set for the first term, based on a predefined consistency criterion, wherein the determined information set is selected from a plurality of information sets associated with the first term, the plurality of information sets including the first information set and the second information set, wherein the predefined consistency criterion specifies to determine the information set by evaluating a plurality of properties of each information set in the plurality of information sets associated with the first term, wherein the plurality of properties include an effective date, an expiry date, and a last-modified timestamp, wherein the determined information set is not the second information set.

14. The system of claim 13, wherein the determined information set is a third information set associated with the first term, wherein the first, second, and third information sets are distinct, wherein the third information set is designated as the active information set for the first term without receiving any request explicitly specifying to designate the third information set as the active information set for the first term, wherein the first information set is designated as not being the active information set for the first term.

15. The system of claim 14, wherein programmatically determining the information set to designate as the active information set for the first term comprises:

generating a set of candidate information sets for the first term and consisting of a subset of the plurality of information sets associated with the first term, by removing any information set having an effective date subsequent to a current date and any information set having an expiry date prior to the current date, wherein at least one information set having the effective date subsequent to the current date is removed, wherein at least one information set having the expiry date prior to the current date is removed;

upon determining that the generated set of candidate information sets does not include any approved information sets, requesting a user to approve at least one candidate information set; and upon determining that the generated set of candidate information sets includes one or more approved information sets, selecting the information set having the latest timestamp among the set of candidate information sets, to designate as the active information set for the first term.

16. The system of claim 15, thereby facilitating consistency between the glossary and the repository and reducing intervention from data stewards of the glossary and of the repository, respectively, wherein each information set has a respective lifecycle state selected from a draft state, a pending state, an approved state, a rejected state, a retired state, and a dropped state, wherein each information set has a respective status selected from an active status, an inactive status, a singleton active status, and a singleton inactive status.

17. The system of claim 16, wherein the glossary comprises a business glossary (BG) having an associated BG data steward, wherein the repository comprises a reference data management (RDM) repository having an associated RDM data steward, wherein the operation further comprises:

generating a suggestion to refine an association between a term in the glossary and an information set in the repository;

determining a confidence measure associated with an action taken by the BG data steward, wherein the action is selected from accepting the suggestion and rejecting the suggestion, wherein the confidence measure is determined based on a steward operation performed by the RDM data steward, wherein the steward operation is selected from a difference operation, an addition operation, and an update operation; and programmatically modifying a suggestion threshold based on the determined confidence measure and without receiving any request specifying to modify the threshold;

wherein the action is, in respective instances, accepting the suggestion and rejecting the suggestion, wherein the steward operation is, in respective instances, the difference operation, the addition operation, and the update operation.

* * * * *